United States Patent
Schmid et al.

(10) Patent No.: US 9,963,243 B1
(45) Date of Patent: May 8, 2018

(54) LANDING DETECTION SYSTEMS

(71) Applicant: GoPro, Inc., San Mateo, CA (US)

(72) Inventors: Lukas Schmid, Zurich (CH); Jean-Bernard Berteaux, Villars-sur-Glâne (CH); Fabio Diem, Zurich (CH); Sammy Omari, Zurich (CH); Thomas Gubler, Winterthur (CH)

(73) Assignee: GoPro, Inc., San Mateo, CA (US)

( * ) Notice: Subject to any disclaimer, the term of this patent is extended or adjusted under 35 U.S.C. 154(b) by 10 days.

(21) Appl. No.: 15/297,903

(22) Filed: Oct. 19, 2016

(51) Int. Cl.
*B64D 45/00* (2006.01)
*B64C 39/02* (2006.01)
*G05D 1/00* (2006.01)

(52) U.S. Cl.
CPC ............ *B64D 45/00* (2013.01); *B64C 39/024* (2013.01); *B64C 2201/024* (2013.01); *B64C 2201/042* (2013.01); *B64C 2201/123* (2013.01); *B64C 2201/146* (2013.01); *G05D 1/0038* (2013.01)

(58) Field of Classification Search
CPC . B64D 45/00; B64C 39/024; B64C 2201/024; B64C 2201/042; B64C 2201/123; B64C 2201/146; G05D 1/0038
See application file for complete search history.

(56) References Cited

U.S. PATENT DOCUMENTS

2017/0084181 A1\* 3/2017 Wilson ................ G08G 5/0069

FOREIGN PATENT DOCUMENTS

CN 104965411 A 10/2015

OTHER PUBLICATIONS

Copter: takes too long to detect landing and trying to disarm causes flipping—Issue #2068—ArduPilot—GitHub—pp. 1-3—Apr., May, 2015.

\* cited by examiner

*Primary Examiner* — Aaron L Troost
(74) *Attorney, Agent, or Firm* — Young Basile Hanlon & MacFarlane, P.C.

(57) ABSTRACT

The disclosure describes systems and methods for detecting an aerial vehicle landing. One method includes performing at least two of a plurality of landing tests to detect the landing of the aerial vehicle. The plurality of landing tests include a static test, a thrust test, and a shock test. Upon a detection of the landing by one of the at least two landing tests performed, the method further includes performing a free-fall test to detect a free fall of the aerial vehicle. The free fall of the aerial vehicle is a change in altitude of the aerial vehicle above an altitude change threshold. Upon a lack of a detection of the free fall by the free-fall test, the method includes setting a landed state for the aerial vehicle. Upon a detection of the free fall by the free-fall test, the method includes setting an in-air state for the aerial vehicle.

20 Claims, 6 Drawing Sheets

LANDING DETECTION SYSTEMS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to landing detection systems. The landing detection systems may include multiple landing detection tests running simultaneously and/or sequentially to improve landing detection.

BACKGROUND

Unmanned aerial vehicles (UAVs) may be used for commercial and recreational purposes. A landing detection system associated with a UAV is designed to reliably detect when the UAV has landed and remains landed such that a disarmed state can be safely implemented. A disarmed state is one in which motors do not provide power, for example, to rotors of the UAV. Existing landing detection systems either require an extended time period to elapse before a landed state is set or suffer from false detections or missed detections of the landed state of the UAV. A false landing detection can result in the UAV being disarmed while still in the air, leading to an undesired impact with the ground or other objects proximate to the UAV.

Landing detection systems often rely on a combination of GPS data, accelerometer data, gyroscope data, and barometer data to determine the landed state. However, aerodynamic ground effects may have a negative impact on barometer readings. Furthermore, GPS sensors may experience signal deterioration close to the ground due to multipath effects. Additionally, accelerometer and gyroscope readings may saturate due to shocks experienced by the UAV upon touch down. Each of these complications may impact the accuracy of landing detection in singular landing tests implemented by traditional landing detection systems.

SUMMARY

Improvements in landing detection systems for UAVs are described below. A UAV may include or be communicatively connected to an imaging device and a remote controller or other external control device configured to assist in and/or implement landing operations for the UAV.

One aspect of the disclosure is a method for detecting a landing of an aerial vehicle. The method includes performing a static test to detect the landing of the aerial vehicle. The static test includes running a static timer for a first time period upon a determination that the aerial vehicle has a static state, and upon expiration of the first time period, determining that the aerial vehicle remains in the static state. The method also includes performing a thrust test to detect the landing of the aerial vehicle. The thrust test includes running a thrust timer for a second time period upon a determination that a thrust level of the aerial vehicle is below a thrust threshold; upon expiration of the second time period, determining that the thrust level of the aerial vehicle remains below the thrust threshold; and upon a determination that the thrust level of the aerial vehicle remains below the thrust threshold, determining that a change in altitude of the aerial vehicle over the second time period is below an altitude change threshold. The method also includes performing a shock test to detect the landing of the aerial vehicle. The shock test includes determining that the aerial vehicle experienced a previous descent upon a determination that a shock is detected; upon a determination that the aerial vehicle experienced the previous descent, determining that a control input of the aerial vehicle has a stick-down state. Upon a detection of the landing by one of the static test, the thrust test, or the shock test, the method further includes performing a free-fall test to detect a free fall of the aerial vehicle; and upon a lack of a detection of the free fall by the free-fall test, setting a landed state for the aerial vehicle.

Another aspect of the disclosure is a non-transitory computer-readable storage medium, comprising executable instructions that, when executed by a processor, facilitate performance of operations. The operations include performing a plurality of landing tests to detect a landing of an aerial vehicle, the plurality of tests including a static test, a thrust test, and a shock test; upon a detection of the landing by one of the plurality of landing tests, performing a free-fall test to detect a free fall of the aerial vehicle; and upon a lack of a detection of the free fall by the free-fall test, setting a landed state for the aerial vehicle.

Another aspect of the disclosure is a method for detecting a landing of an aerial vehicle. The method includes performing at least two landing tests to detect the landing of the aerial vehicle. The landing tests include a static test, a thrust test, and a shock test. Upon a detection of the landing by one of the at least two landing tests performed, the method further includes performing a free-fall test to detect a free fall of the aerial vehicle. The free fall of the aerial vehicle is a change in altitude of the aerial vehicle above an altitude change threshold. Upon a lack of a detection of the free fall by the free-fall test, the method includes setting a landed state for the aerial vehicle. Upon a detection of the free fall by the free-fall test, the method includes setting an in-air state for the aerial vehicle.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed embodiments have other advantages and features that will be more readily apparent from the detailed description, the appended claims, and the accompanying figures. A brief introduction of the figures is below.

All figures disclosed herein are © Copyright 2016 GoPro Inc. All rights reserved.

DETAILED DESCRIPTION

Improvements in landing detection are possible by use of multiple landing tests to detect a landing of an aerial vehicle, such as a UAV. First-stage landing tests may include a static test, a thrust test, and a shock test. Upon a detection of the landing by at least one of the first-stage landing tests, a second-stage landing test, a free-fall test, may be performed to detect a free fall (or more aptly, an absence of a free fall) of the aerial vehicle. The free-fall test aims to avoid false detections by the first-stage landing tests. Once both the first- and second-stage landing tests are met, a landed state may be set for the aerial vehicle and the aerial vehicle may be safely disarmed. Use of multiple landing tests avoids both missed landing detections and false landing detections while shortening the overall landing process, improving landing detection systems.

The present technology will now be described in detail with reference to the drawings that are provided as illustrative examples to enable those skilled in the art to practice the technology. The figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

Figure 1A:
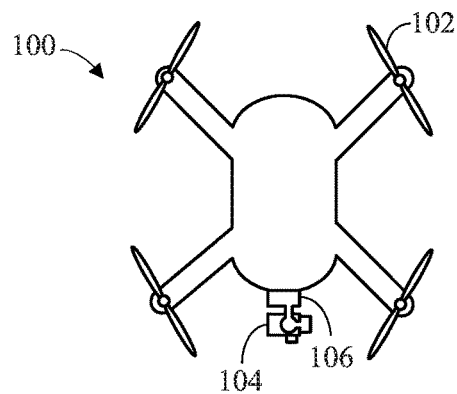
FIG. 1A shows an example of a UAV.

FIG. 1A shows an example of a UAV 100. In this embodiment, the UAV 100 has a quad-copter configuration, that is, the UAV 100 includes four rotors 102. Each rotor 102 is driven by a separate electric motor (not shown). However, the UAV 100 may be any form of an aerial vehicle. A battery pack (not shown) mounted on or in a body of the UAV 100 may supply electrical power to all four electric motors, flight electronics (not shown) associated with operation of UAV 100, and an imaging device 104 that provides still and video images by means of a communication link (not shown) to a ground-based user. The imaging device 104 may be coupled to a front of the UAV 100 using, for example, a movement mechanism 106.

In FIG. 1A, the movement mechanism 106 removably mounts the imaging device 104 to the UAV 100. The implementation of the movement mechanism 106 shown in this example is a three-axis gimbal that permits the imaging device 104 to be rotated about three independent axes. However, the movement mechanism 106 may include any type of translational and/or rotational elements that permit rotational and/or translational movement in one, two, or three dimensions of the imaging device 104 in respect to the UAV 100.

Figure 1B:
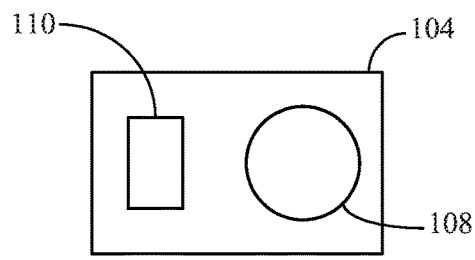
FIG. 1B shows an example of the imaging device associated with the UAV.

FIG. 1B shows an example of the imaging device 104 associated with the UAV 100. In FIG. 1B, the imaging device 104 is a GoPro Hero4® or Hero5® camera, however any type of imaging device 104 that can be coupled to the UAV 100, for example, through use of the movement mechanism 106, may be utilized. The imaging device 104 may include still image and video capture capabilities. FIG. 1B shows a lens 108 of the imaging device 104 and a display screen 110 associated with the imaging device 104. Means for coupling the imaging device 104 to the UAV 100 and/or the movement mechanism 106 are not shown.

Figure 1C:
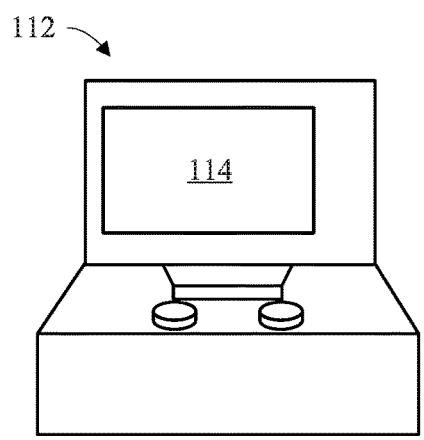
FIG. 1C shows an example of a remote controller and user interface for the UAV.

FIG. 1C shows an example of a remote controller 112 including a user interface 114 for operating the UAV 100. The remote controller 112 may include a communications interface (not shown) via which the remote controller 112 may receive and send commands related to operation of the UAV 100, the imaging device 104, and the movement mechanism 106. The commands can include movement commands, configuration commands, operational control commands, and imaging commands. In some implementations, the remote controller 112 may be a smartphone, a tablet computer, a phablet, a smart watch, a portable computer, and/or another device configured to receive user input and communicate information with the imaging device 104, the movement mechanism 106, and/or the UAV 100.

For example, flight direction, attitude, and altitude of the UAV 100 may all be controlled by controlling speeds of the motors that drive the respective rotors 102 of the UAV 100. During flight, a GPS receiver on the UAV 100 may provide navigational data to the remote controller 112 for use in determining flight paths and displaying current location through the user interface 114. A vision-based navigation system may also be implemented that tracks visually significant features through image data captured by the imaging device 104 to provide the necessary speed and position of the UAV 100 to the remote controller 112.

The communications interface may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the communications interface may be effectuated using a wired interface, e.g., HDMI, USB, digital video interface, display port interface (e.g., digital display interface developed by the Video Electronics Standards Association (VESA), Ethernet, Thunderbolt), and/or other interface.

The remote controller 112 may operate a software application (e.g., GoPro Studio®, GoPro App®, and/or other application) configured to perform a variety of operations related to camera configuration, positioning of the movement mechanism 106, control of video acquisition, and/or display of video captured by the imaging device 104 through the user interface 114. An application (e.g., GoPro App)® may enable a user to create short video clips and share video clips to a cloud service (e.g., Instagram®, Facebook®, YouTube®, Dropbox®); perform full remote control of functions of the imaging device 104; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 104 and/or displaying the captured information.

Figure 2:
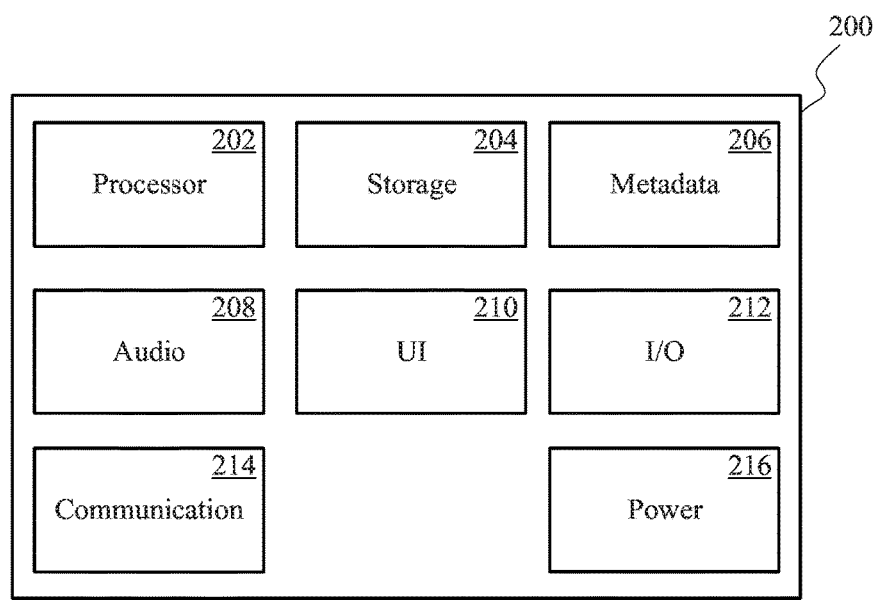
FIG. 2 is a block diagram illustrating components of a computing device.

FIG. 2 is a block diagram illustrating components of a computing device 200. The computing device 200 may be a single component of the UAV 100, the imaging device 104, the movement mechanism 106, or the remote controller 112. The computing device 200 may be multiple computing devices distributed in various ways between the UAV 100, the imaging device 104, the movement mechanism 106, or the remote controller 112. In the examples described, the computing device 200 may provide communication and control functions to the various components described in reference to FIGS. 1A, 1B, and 1C.

The computing device 200 may include a processor 202. The processor 202 may include a system on a chip (SOC), microcontroller, microprocessor, CPU, DSP, ASIC, GPU, or other processors that control the operation and functionality of the UAV 100, the imaging device 104, the movement mechanism 106, and/or the remote controller 112. The processor 202 may interface with mechanical, electrical, sensory, and power modules via driver interfaces and software abstraction layers. Additional processing and memory capacity may be used to support these processes. These components may be fully controlled by the processor 202. In some implementations, one or more components may be operable by one or more other control processes (e.g., a GPS receiver may include a processing apparatus configured to provide position and motion information to the processor 202 in accordance with a given schedule (e.g., values of latitude, longitude, and elevation at 10 Hz.))

The computing device 200 may also include electronic storage 204 in which configuration parameters, image data, and/or code for functional algorithms may be stored. The electronic storage 204 may include a system memory module that is configured to store executable computer instructions that, when executed by the processor 202, control various functions of the UAV 100, the imaging device 104, the movement mechanism 106, and/or the remote controller 112. The electronic storage 204 may also include storage memory configured to store content (e.g., metadata, frames, video, and audio) captured by the imaging device 104 or sensors associated with the UAV 100, the movement mechanism 106, and/or the remote controller 112.

The electronic storage 204 may include non-transitory memory configured to store configuration information and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture. Additional electronic storage 204 may be available for other hardware, firmware, or software needs of the UAV 100, the imaging device 104, the movement mechanism 106, and/or the remote controller 112. The memory and processing capacity may aid in management of processing configuration (e.g., loading, replacement) operations during a startup and/or other operations.

The computing device 200 may include or be in communication with metadata sources 206. The metadata sources 206 may include sensors associated with the UAV 100, the imaging device 104, and/or the movement mechanism 106. The sensors may include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor), and/or other sensors. The imaging device 104 may also provide metadata sources 206, e.g., image sensors, a battery monitor, storage parameters, and other information related to camera operation and capture of content. The metadata sources 206 may obtain information related to an environment of the UAV 100 and aspects in which the content is captured.

By way of a non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The metadata sources 206 may be rigidly coupled to the UAV 100, the imaging device 104, the movement mechanism 106, and/or the remote controller 112 such that the processor 202 may be operable to synchronize various types of information received from various types of metadata sources 206.

For example, using timing information, metadata information may be related to content (frame or video) captured by an image sensor. In some implementations, the metadata capture may be decoupled from the video or frame capture. That is, metadata may be stored before, after, and in-between one or more video clips or frames. In one or more implementations, the processor 202 may perform operations on the received metadata to generate additional metadata information. For example, the processor 202 may integrate received acceleration information to determine a velocity profile of the imaging device 104 during a recording of a video.

The computing device 200 may include or be in communication with audio sources 208, such as one or more microphones, configured to provide audio information that may be associated with images acquired by the imaging device 104 or commands provided by the remote controller 112. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codec.) In one or more implementations of spherical video and audio, the audio codec may include a 3-dimensional audio codec. For example, an Ambisonics codec can produce full surround audio including a height dimension. Using a G-format Ambionics codec, a special decoder may not be required.

The computing device 200 may include or be in communication with a user interface (UI) 210. The UI 210 may include a display configured to provide information related to operation modes (e.g., camera modes, flight modes), connection status (e.g., connected, wireless, wired), power modes (e.g., standby, sensor, video), metadata sources 206 (e.g., heart rate, GPS, barometric), and/or other information associated with the UAV 100, the imaging device 104, the movement mechanism 106, and/or the remote controller 112. In some implementations, the UI 210 may include virtually any device capable of registering inputs from and communicating outputs to a user. These may include, without limitation, display, touch, gesture, proximity, light, sound receiving/emitting, wired/wireless, and/or other input/output devices. The UI 210 may include a display, one or more tactile elements (e.g., joysticks, switches, buttons, and/or virtual touch screen buttons), lights (LED), speaker, and/or other interface elements.

The UI 210 may be configured to enable the user to provide commands to the UAV 100, the imaging device 104, and/or the movement mechanism 106. For example, the user interface 114 shown in FIG. 1C is one example of the UI 210. User commands provided using the UI 210 may be encoded using a variety of approaches, including but not limited to duration of a button press (pulse width modulation), number of button presses (pulse code modulation), or a combination thereof. For example, two short button presses through the UI 210 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 200 may include an input/output (I/O) module 212. The I/O module 212 may be configured to synchronize the imaging device 104 with the remote controller 112, a second capture device, a smartphone, and/or a video server. The I/O module 212 may be configured to communicate information to and from various I/O components. The I/O module 212 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 212 may interface with LED lights, a display, a button, a microphone, speakers, and other I/O components. In one or more implementations, the I/O module 212 may be coupled to an energy source such as a battery or other DC electrical source.

The computing device 200 may include a communication module 214 coupled to the I/O module 212. The communication module 214 may include a component (e.g., a dongle) having an infrared sensor, a radio frequency transceiver and antenna, an ultrasonic transducer, and/or other communications interfaces used to send and receive wireless communication signals. In some implementations, the communication module 214 may include a local (e.g., Bluetooth, Wi-Fi) or broad range (e.g., cellular LTE) communications interface configured to enable communications between the UAV 100, the imaging device 104, the movement mechanism 106, and/or the remote controller 112.

The communication module 214 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, the communication module 214 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 214 may be represented using formats including one or more of hypertext markup language (HTML), extensible markup language (XML), and/or other formats. One or more exchanges of information between the imaging device 104 and outside devices, such as the remote controller 112, may be encrypted using encryption technologies including one or more of secure sockets layer (SSL), transport layer security (TLS), virtual private networks (VPNs), Internet Protocol security (IPsec), and/or other encryption technologies.

The computing device 200 may include a power system 216 that may moderate a power supply based on the needs of the UAV 100, the imaging device 104, the movement mechanism 106, and/or the remote controller 112. For example, a battery, solar cell, inductive (contactless) power source, rectification, or other power supply housed within the UAV 100 may be controlled by the power system 216 to supply power for the imaging device 104 and/or the movement mechanism 106 when in a coupled state as shown in FIG. 1A.

Figure 3:
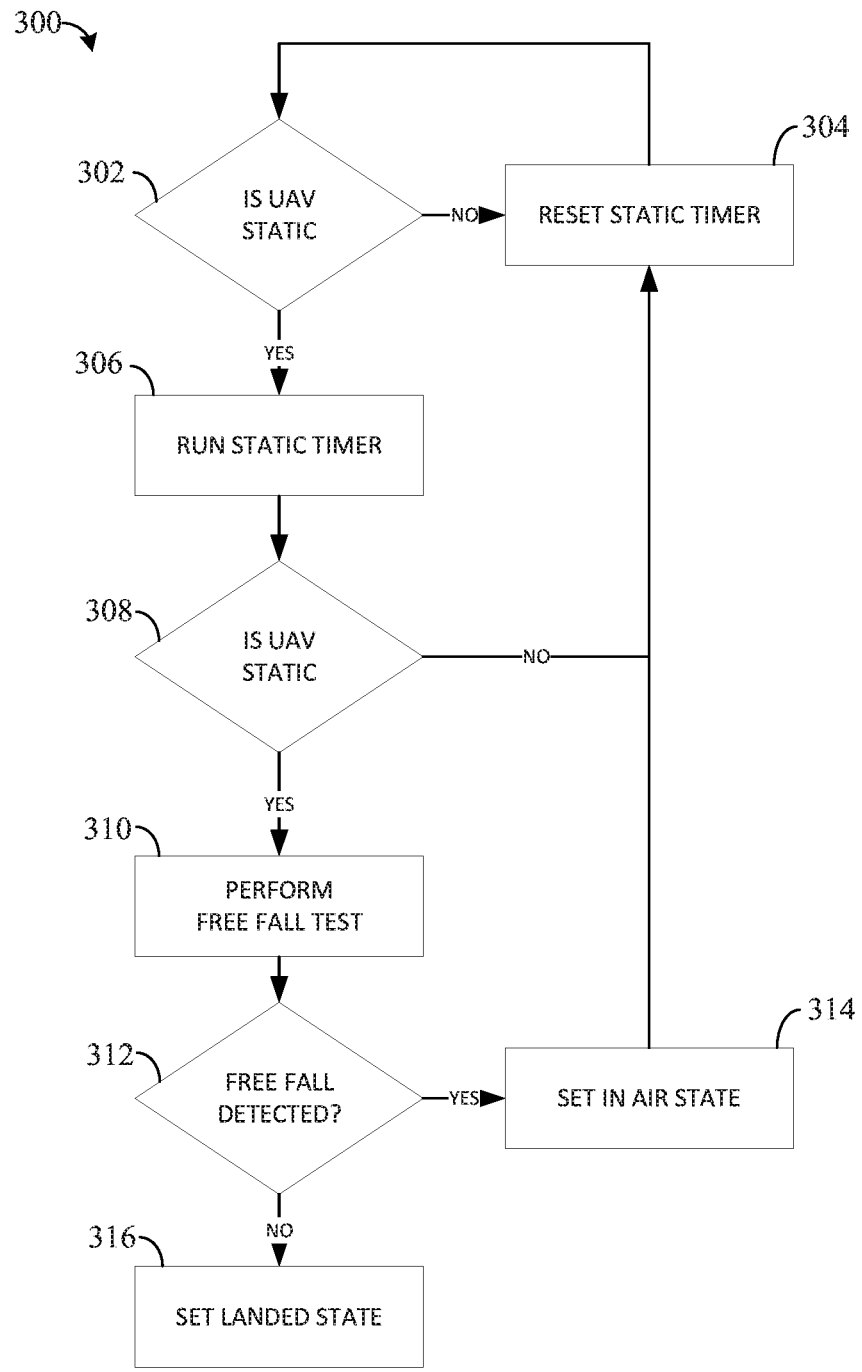
FIG. 3 is a flowchart showing a landing detection example.

FIG. 3 is a flowchart showing a landing detection example. A landing detection process 300 may begin at decision block 302 where a determination is made as to whether the UAV 100 is in a static state. A static test, a type of landing test, may include detecting whether the UAV 100 is in the static state. Detecting the static state may include determining whether the UAV 100 is experiencing movement above or below a movement threshold, for example, based on information from various metadata sources 206 such as accelerometers, GPS sensors, altimeters, barometers, etc. Each of the metadata sources 206 may have an associated movement threshold above which the UAV 100 is determined to be moving, and thus, not in a static state, and below which the UAV 100 is determined to be still, and thus, in a static state. Determining whether the various metadata sources 206 indicate movement above or below a movement threshold is difficult in some situations, for example, where the vehicle is landing on a boat, landing on another moving vehicle, and/or landing on any other unstable surface that is itself subject to some movement. Properly detecting movement above or below a movement threshold may also be difficult when the UAV 100 is experiencing ground effects.

Upon a determination at decision block 302 that the UAV 100 is not in a static state, the process 300 moves to operation 304 where a static timer is reset before returning to decision block 302. Upon a determination at decision block 302 that the UAV 100 is in a static state, the static timer is initiated in operation 306. The static timer is configured to run for a predetermined time period, for example, several seconds. Upon expiration of the predetermined time period, the process 300 moves to decision block 308 where a determination is again made as to whether the UAV 100 is in a static state.

Upon a determination at decision block 308 that the UAV 100 is not in a static state, the process 300 returns to operation 304 where the static timer is reset. In other words, the UAV 100 was initially found to be in the static state at the decision block 302. However, after the predetermined time period associated with the static timer elapsed, another determination of whether the UAV 100 was in the static state at decision block 308 as part of the static test indicates that the static state has not been maintained, so the process 300 starts over, moving back to operation 304 where the static timer is reset before returning to decision block 302.

Allowing the predetermined time period to elapse between determinations as to whether the UAV 100 is in a static state at the decision blocks 302, 308 as part of the static test lowers the number of false landing detections. The shorter the predetermined time period for the static timer, the higher the number of false landing detections. But, the use of longer predetermined time periods for the static timer to avoid false detections may waste time and energy, causing the UAV 100 to idle for a period of time after landing before being disarmed. Additional operations beyond the static test may be added to the landing detection process 300 to both reduce the predetermined time period for the static timer and avoid false landing detections.

For example, upon a determination at decision block 308 that the UAV 100 remains in the static state after the predetermined time period, a landing is considered to have been detected by the static test, and the process 300 moves to operation 310 where a free-fall test is performed. The free-fall test is another type of landing test designed to detect a landing of the UAV 100. The free-fall test may include a determination that a thrust level of the UAV 100 has been set to a low value, for example, near or at zero. If the thrust level is below the threshold, the free-fall test may also include determining that a change in altitude of the UAV 100 over another predetermined time period is above an altitude change threshold. The change in altitude can be measured based on input from, for example, various metadata sources 206 such as an altimeter, a barometer, and/or an accelerometer. The altitude change threshold can be based on physical properties and dynamic properties of the UAV 100. In one example, a lowering of several meters over several seconds may exceed the altitude change threshold and indicate a free fall for the UAV 100. The predetermined time period associated with the free-fall test may differ from the predetermined time period associated with the static test.

After performing the free-fall test, the process 300 moves to decision block 312 where a determination is made as to whether a free fall is detected. If a free fall is detected at decision block 312, the process 300 moves to operation 314, and an in-air state is set for the UAV 100. In other words, if a free fall is detected, the UAV 100 has not yet reached the ground during its descent toward landing, and the UAV 100 is treated as airborne. After setting the in-air state, the process 300 returns to operation 304 where the static timer is reset before returning to decision block 302. If a free fall is not detected at decision block 312, the process 300 moves to operation 316 and a landed state for the UAV 100 is set. When the landed state is set, the motors that drive the rotors 102 of the UAV 100 can be disarmed. Thus, the free-fall test determines whether the UAV 100 will be classified as having an in-air state indicating movement above a movement threshold or a landed state indicating movement of the aerial vehicle below the movement threshold.

The goal of the landing detection process 300 described in FIG. 3 is to detect all landings as quickly as possible without false positives. By including the free-fall test in the process 300 after the static test, a shorter time can be used for the predetermined time period for the static timer. For example, the predetermined time period used for the duration of the static timer in operation 306 of FIG. 3 can be two seconds as compared to a static timer having a duration of approximately four to five seconds in slower, less sensitive landing detection systems. The free-fall test performed in operation 310 takes a negligible amount of time when compared to the time period associated with the static timer and removes the possibility for false landing detections. The landing detection system described in FIG. 3 is thus improved over existing landing detection systems.

Figure 4:
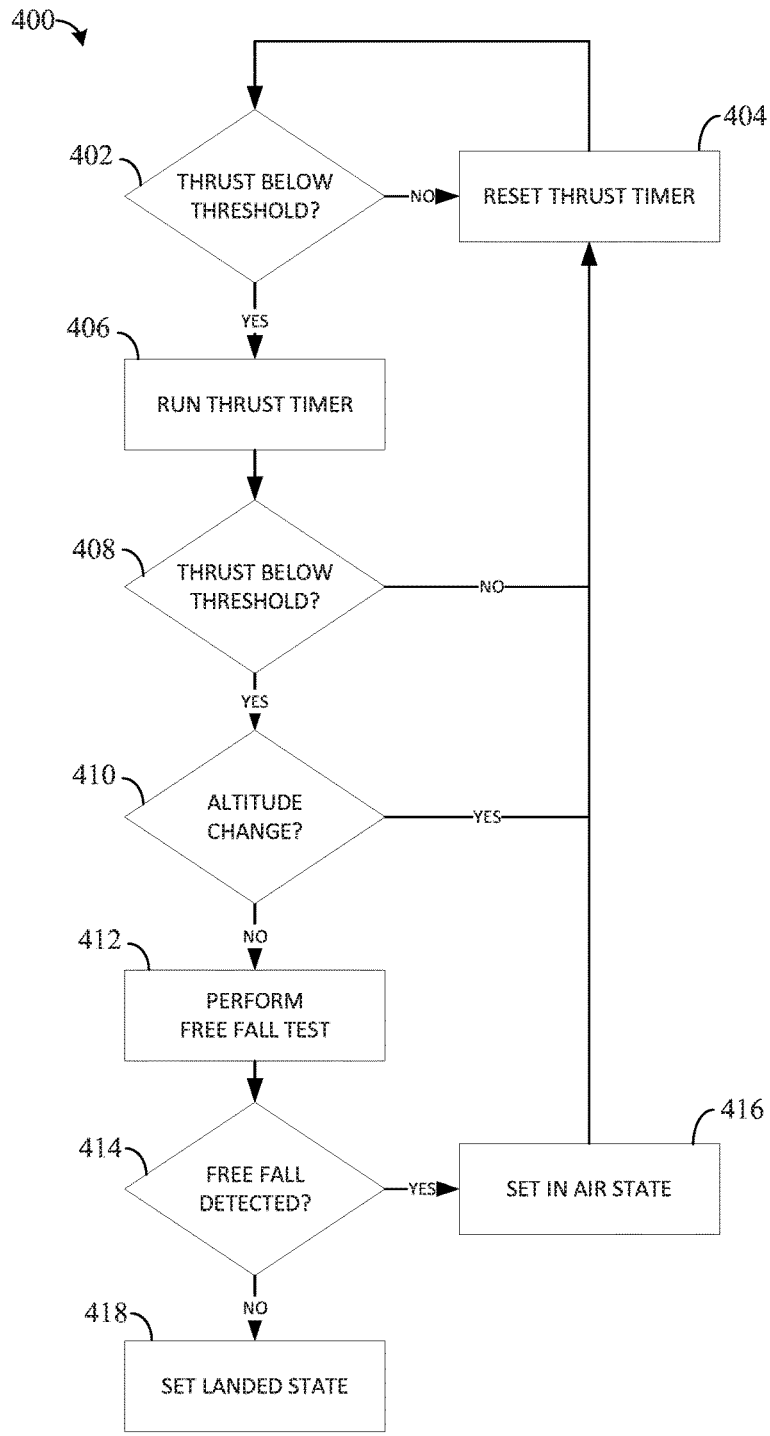
FIG. 4 is a flowchart showing another landing detection example.

FIG. 4 is a flowchart showing another landing detection example. A landing detection process 400 may begin at decision block 402 where a determination is made as to whether a thrust level of the UAV 100 is below a thrust threshold, for example, the thrust level is near or at zero. This determination at decision block 402 is the first operation in a thrust test for landing detection. The thrust test is part of the more robust landing detection process 400 that can handle higher vibration levels, such as when the UAV 100 is landing on a moving vehicle.

Upon a determination at decision block 402 that the thrust level is not below a thrust threshold, the process 400 moves to operation 404 where a thrust timer is reset before returning to decision block 402. Upon a determination at decision block 402 that the thrust level of UAV 100 is below the thrust threshold, the thrust timer is initiated in operation 406. The thrust timer is configured to run for a predetermined time period, for example, three to four seconds. Upon expiration of the predetermined time period, the process 400 moves to decision block 408, where a determination is again made as to whether the thrust level of the UAV 100 below the thrust threshold.

Upon a determination at decision block 408 that the thrust level of the UAV 100 is not below the thrust threshold, the process 400 returns to operation 404 where the thrust timer is reset. In other words, the thrust level below the thrust threshold determined at decision block 402 has not been maintained for the predetermined time period associated with the thrust timer, so the process 400 starts over, moving back to operation 404 where the thrust timer is reset before returning to decision block 402.

Upon a determination at decision block 408 that the thrust level of the UAV 100 remains below the thrust threshold after the predetermined time period associated with the thrust timer, the process 400 moves to the decision block 410. At decision block 410, a determination is made as to whether the UAV 100 is undergoing a change in altitude, for example, above an altitude change threshold. The altitude change threshold can be set at a low value, for example, several meters, in order to determine whether the UAV 100 is currently ascending or descending. Upon a determination at decision block 410 that the UAV 100 is currently experiencing a change in altitude, the process 400 again starts over, moving back to operation 404 where the thrust timer is reset before returning to decision block 402. Upon a determination at decision block 410 that the UAV is not currently experiencing a change in altitude, a landing is considered to have been detected by the thrust test, and the process 400 moves to operation 412 where a free-fall test is performed.

As described above in respect to FIG. 3, the free-fall test may include a determination that a thrust level of the UAV 100 has been set to a low value, for example, near or at zero. The free-fall test may also include determining that a change in altitude of the UAV 100 over another predetermined time period is above an altitude change threshold. The change in altitude can be measured based on input from, for example, various metadata sources 206 such as an altimeter, a barometer, and/or an accelerometer. The altitude change threshold can be based on physical properties and dynamic properties of the UAV 100. In one example, a lowering of several meters over several seconds may exceed the altitude change threshold and indicate a free fall for the UAV 100. The predetermined time period associated with the free-fall test may differ from the predetermined time period associated with the thrust test.

After performing the free-fall test, the process 400 moves to decision block 414 where a determination is made as to whether a free fall is detected. If a free fall is detected at decision block 414, the process 400 moves to operation 416, and an in-air state is set for the UAV 100. In other words, if a free fall is detected, the UAV 100 has not yet reached the ground during its descent toward landing, and the UAV 100 is treated as airborne. After setting the in-air state, the process 400 returns to operation 404 where the thrust timer is reset before returning to decision block 402. If a free fall is not detected at decision block 414, the process 400 moves to operation 418 and a landed state for the UAV 100 is set. When the landed state is set, the motors that drive the rotors 102 of the UAV 100 can be disarmed. Thus, the free-fall test determines whether the UAV 100 will be classified as having an in-air state indicating movement above a movement threshold or a landed state indicating movement of the aerial vehicle below the movement threshold.

Figure 5:
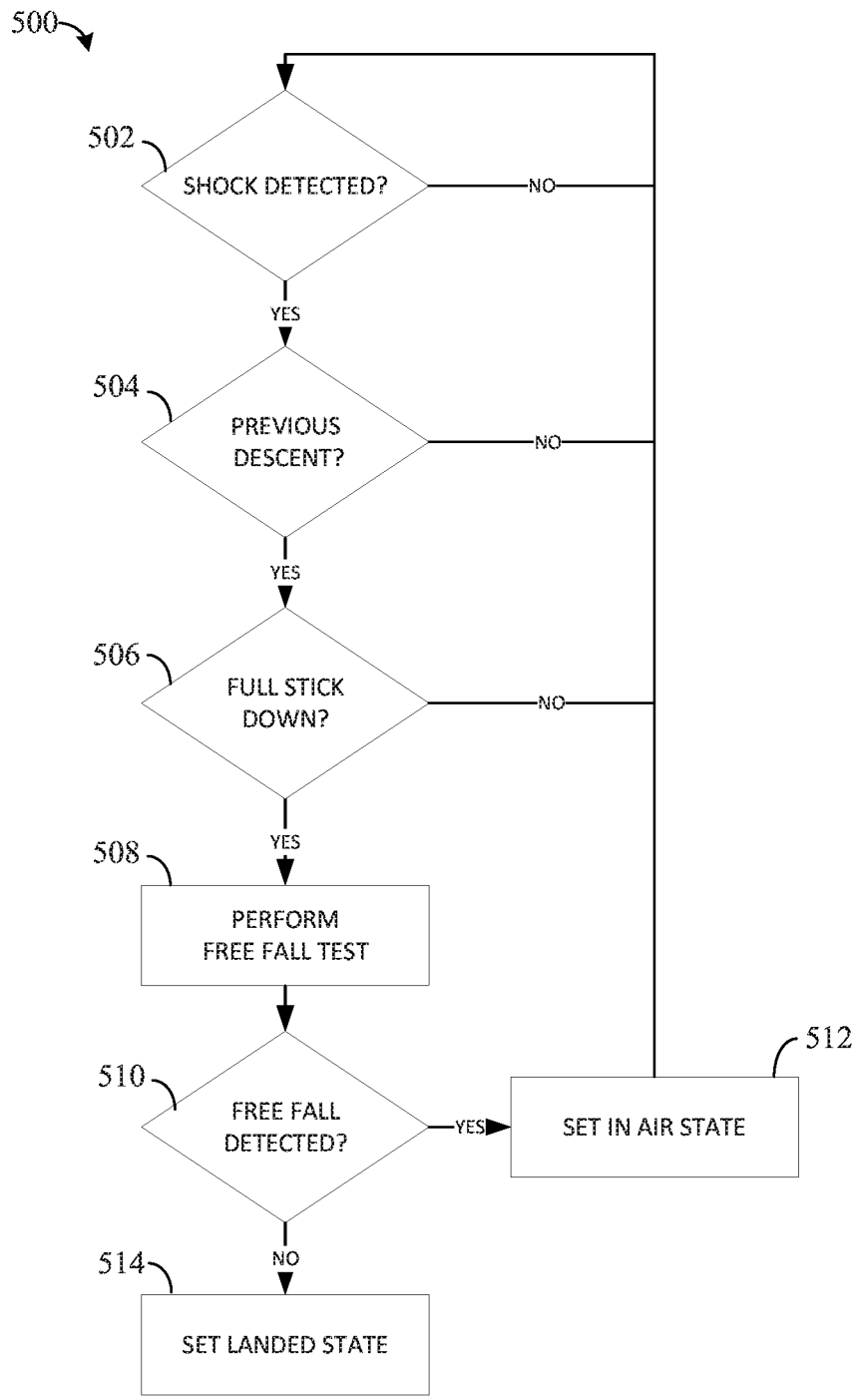
FIG. 5 is a flowchart showing another landing detection example.

FIG. 5 is a flowchart showing another landing detection example. A landing detection process 500 may begin at decision block 502 where a determination is made as to whether a shock is detected by the UAV 100 as part of a shock test for landing detection. Shock detection can be based, for example, on information or input received from an accelerometer or other metadata source 206 that indicates a spike in movement representative of the UAV 100 touching down on the ground or other landing surface during a landing.

Upon a determination at decision block 502 that a shock is not detected by the UAV 100, the process 500 returns to decision block 502. Upon a determination at decision block 502 that a shock is detected, the process 500 moves to decision block 504 where a determination is made as to whether the UAV 100 has experienced a previous descent in altitude as part of the shock test. A previous descent in altitude by the UAV 100 may include some recently experienced directional changes for the UAV 100, though the end result is that the UAV 100 has lowered in altitude over a previous, predetermined time period. For example, the UAV 100 may move down, then up, then down over a previously experienced period of five seconds as measured using, for example, an altimeter, an accelerometer, and/or other metadata source 206.

Upon a determination at decision block 504 that a previous descent in altitude is not detected, the process 500 returns to decision block 502. Upon a determination at decision block 504 that a previous descent in altitude is detected, the process 500 moves to decision block 506 where a determination is made as to whether a control input of the UAV 100 has a stick-down state as part of the shock test. For example, a bottommost (or leftmost, or topmost, or rightmost) position of a joystick serving as part of the user interface 114 of the UAV 100 may be such that a user is indicating a desire to land the UAV 100 through moving a joystick associated with the remote controller 112. That is, the stick-down state of the joystick may be consistent with a user's desire to land the UAV 100.

Upon a determination at decision block 506 that a stick-down state of a control input for the UAV 100 is not present, the process 500 returns to decision block 502. Upon a determination at decision block 506 that a stick-down state of a control input for the UAV 100 is present, a landing is considered to have been detected by the shock test. An overall duration of the shock test, inclusive of decision blocks 502, 504, 506 of the process 500, can be as short as several milliseconds. After completion of each component of the shock test, the process 500 moves to operation 508 where a free-fall test is performed.

As described above in respect to FIGS. 3 and 4, the free-fall test may include a determination that a thrust level of the UAV 100 has been set to a low value, for example, near or at zero. The free-fall test may also include determining that a change in altitude of the UAV 100 over a predetermined time period is above an altitude change threshold. The change in altitude can be measured based on input from, for example, various metadata sources 206 such as an altimeter, a barometer, and/or an accelerometer. The altitude change threshold can be based on physical properties and dynamic properties of the UAV 100. In one example, a lowering of several meters over several seconds may exceed the altitude change threshold and indicate a free fall for the UAV 100.

After performing the free-fall test, the process 500 moves to decision block 510 where a determination is made as to whether a free fall is detected. If a free fall is detected at decision block 510, the process 500 moves to operation 512, and an in-air state is set for the UAV 100. In other words, if a free fall is detected, the UAV 100 has not yet reached the ground during its descent toward landing, and the UAV 100 is treated as airborne. After setting the in-air state, the process 500 returns to decision block 502. If a free fall is not detected at the decision block 510, the process 500 moves to operation 514 and a landed state for the UAV 100 is set. When the landed state is set, the motors that drive the rotors 102 of the UAV 100 can be disarmed. Thus, the free-fall test determines whether the UAV 100 will be classified as having an in-air state indicating movement above a movement threshold or a landed state indicating movement of the aerial vehicle below the movement threshold.

Figure 6:
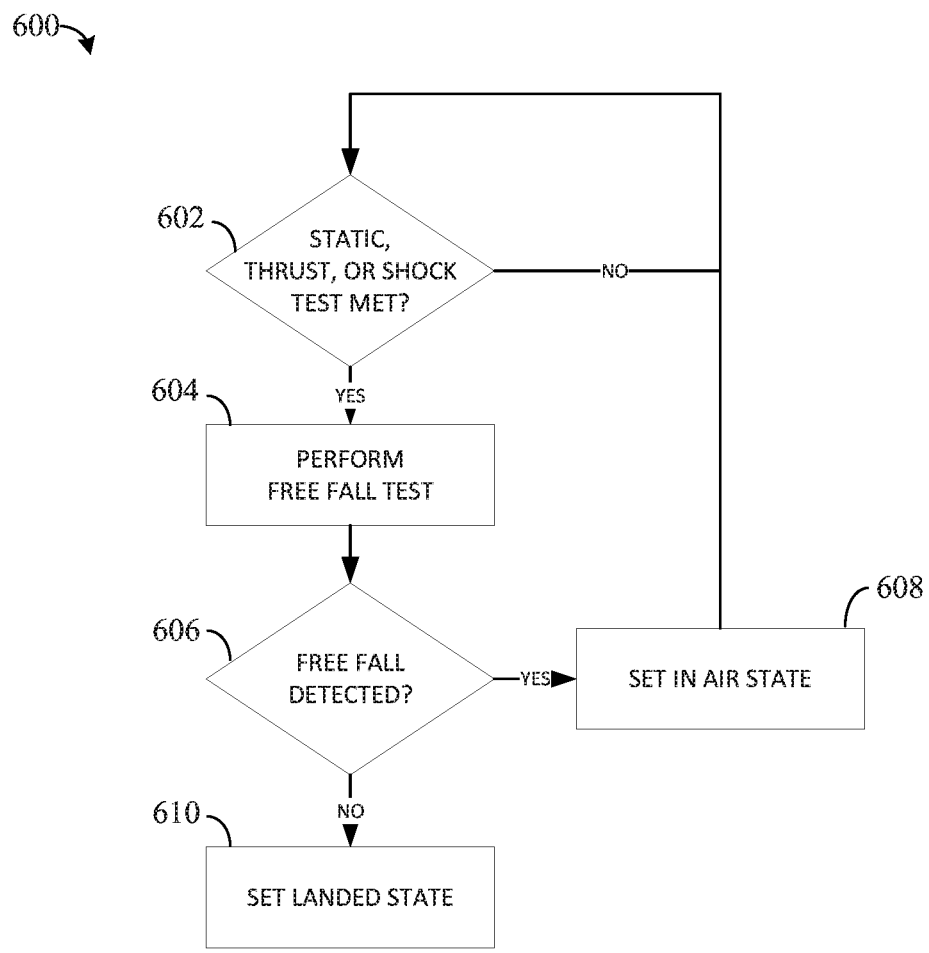
FIG. 6 is a flowchart showing another landing detection example.

FIG. 6 is a flowchart showing another landing detection example. A landing detection process 600 may begin at decision block 602 where a determination is made as to whether at least one of a static test, a shock test, or a thrust test indicates that a landing of the UAV 100 is detected. The static test may include operations described as associated with the static test in respect to FIG. 3. The thrust test may include operations described as associated with the thrust test in respect to FIG. 4. The shock test may include operations described as associated with the shock test in respect to FIG. 5. Each type of landing test can be performed simultaneously, the benefit being that the different tests have different strengths in various landing scenarios where landing conditions may differ. Performing a variety of different tests also helps to avoid missed landing detections based on any shortcomings of the various metadata sources 206.

Upon a determination at decision block 602 that a landing is not detected by any of the landing tests, the process 600 returns to decision block 602. Upon a determination at decision block 606 that at least one of the landing tests is met, that is, that a landing is detected, the process 600 moves to operation 604 where a free-fall test is performed. The free-fall test is designed to avoid false positives in any one of the previously executed landing tests. Another benefit of requiring only one of multiple landing tests being performed simultaneously to be met is the potential for a much shorter time to reach a landed state and disarming of the vehicle.

As described above in respect to FIGS. 3, 4, and 5, the free-fall test may include a determination that a thrust level of the UAV 100 has been set to a low value, for example, near or at zero. The free-fall test may also include determining that a change in altitude of the UAV 100 over a predetermined time period is above an altitude change threshold. The change in altitude can be measured based on input from, for example, various metadata sources 206 such as an altimeter, a barometer, and/or an accelerometer. The altitude change threshold can be based on physical properties and dynamic properties of the UAV 100. In one example, a lowering of several meters over several seconds may exceed the altitude change threshold and indicate a free fall for the UAV 100.

After performing the free-fall test, the process 600 moves to decision block 606 where a determination is made as to whether a free fall is detected. If a free fall is detected at decision block 606, the process 600 moves to operation 608, and an in-air state is set for the UAV 100. In other words, if a free fall is detected, the UAV 100 has not yet reached the ground during its descent toward landing, and the UAV 100 is treated as airborne. After setting the in-air state, the process 600 returns to decision block 602. If a free fall is not detected at the decision block 606, the process 600 moves to operation 610 and a landed state for the UAV 100 is set. When the landed state is set, the motors that drive the rotors 102 of the UAV 100 can be disarmed. Thus, the free-fall test determines whether the UAV 100 will be classified as having an in-air state indicating movement above a movement threshold or a landed state indicating movement of the aerial vehicle below the movement threshold.

Where certain elements of these implementations may be partially or fully implemented using known components, only those portions of such known components that are necessary for an understanding of the present disclosure have been described. Detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the term "computing device" is meant to include personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor," and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. A method for detecting a landing of an aerial vehicle, comprising: performing a static test to detect the landing of the aerial vehicle, the static test comprising:
   upon a determination that the aerial vehicle has a static state, running a static timer for a first time period; and
   upon expiration of the first time period, determining that the aerial vehicle remains in the static state;
   performing a thrust test to detect the landing of the aerial vehicle, the thrust test comprising:
   upon a determination that a thrust level of the aerial vehicle is below a thrust threshold, running a thrust timer for a second time period;
   upon expiration of the second time period, determining that the thrust level of the aerial vehicle remains below the thrust threshold; and
      upon a determination that the thrust level of the aerial vehicle remains below the thrust threshold, determining that a change in altitude of the aerial vehicle over the second time period is below an altitude change threshold; performing a shock test to detect the landing of the aerial vehicle, the shock test comprising:
   upon a determination that a shock is detected, determining that the aerial vehicle experienced a previous descent; and
      upon a determination that the aerial vehicle experienced the previous descent, determining that a control input of the aerial vehicle has a stick-down state;
      upon a detection of the landing by one of the static test, the thrust test, or the shock test, performing a free-fall test to detect a free fall of the aerial vehicle;
   upon a lack of a detection of the free fall by the free-fall test, setting a landed state for the aerial vehicle and disarming a rotor of the aerial vehicle; and
   upon a detection of the free fall by the free-fall test, setting an in-air state for the aerial vehicle and not disarming the rotor of the aerial vehicle.

2. The method of claim 1, wherein detecting the free fall comprises determining that a change in altitude of the aerial vehicle over a third time period is above the altitude change threshold.

3. The method of claim 1, further comprising:
   upon a detection of the free fall by the free-fall test, setting an in-air state for the aerial vehicle.

4. The method of claim 1, wherein the static test, the thrust test, and the shock test are performed approximately simultaneously.

5. A non-transitory computer-readable storage medium, comprising executable instructions that, when executed by a processor, facilitate performance of operations, comprising:
   performing a plurality of landing tests to detect a landing of an aerial vehicle, the plurality of landing tests including a static test, a thrust test, and a shock test;
   upon a detection of the landing by one of the plurality of landing tests, performing a free-fall test to detect a free fall of the aerial vehicle;
   upon a lack of a detection of the free fall by the free-fall test, setting a landed state for the aerial vehicle and disarming a rotor of the aerial vehicle; and
   upon a detection of the free fall by the free-fall test, setting an in-air state for the aerial vehicle and not disarming the rotor of the aerial vehicle.

6. The medium of claim 5, wherein the static test comprises:
   upon a determination that the aerial vehicle has a static state, running a static timer for a predetermined time period; and
   upon expiration of the predetermined time period, determining that the aerial vehicle remains in the static state.

7. The medium of claim 6, wherein the static state of the aerial vehicle indicates movement of the aerial vehicle below a movement threshold.

8. The medium of claim 5, wherein the thrust test comprises:
   upon a determination that a thrust level of the aerial vehicle is below a thrust threshold, running a thrust timer for a predetermined time period;
   upon expiration of the predetermined time period, determining that the thrust level of the aerial vehicle remains below the thrust threshold; and
   upon a determination that the thrust level of the aerial vehicle remains below the thrust threshold, determining that a change in altitude of the aerial vehicle is below an altitude change threshold.

9. The medium of claim 5, wherein the shock test comprises:
   upon a determination that a shock is detected, determining that the aerial vehicle experienced a previous descent; and
   upon a determination that the aerial vehicle experienced the previous descent, determining that a control input of the aerial vehicle has a stick-down state.

10. The medium of claim 9, wherein a previous descent is determined based on a detection of a decrease in altitude of the aerial vehicle over a previous, predetermined time period.

11. The medium of claim 5, wherein detecting the free fall comprises determining that a change in altitude of the aerial vehicle is above an altitude change threshold.

12. The medium of claim 5, further comprising:
   upon a detection of the free fall by the free-fall test, setting an in-air state for the aerial vehicle.

13. The medium of claim 12, wherein the in-air state of the aerial vehicle indicates movement of the aerial vehicle above a movement threshold and the landed state of the aerial vehicle indicates movement of the aerial vehicle below the movement threshold.

14. The medium of claim 5, wherein the static test, the thrust test, and the shock test are performed simultaneously.

15. A method for detecting a landing of an aerial vehicle, comprising: performing at least two landing tests to detect the landing of the aerial vehicle, the landing tests including a static test, a thrust test, and a shock test;
   upon a detection of the landing by one of the at least two landing tests performed, performing a free-fall test to detect a free fall of the aerial vehicle, wherein the free fall of the aerial vehicle is a change in altitude of the aerial vehicle above an altitude change threshold;

upon a lack of a detection of the free fall by the free-fall test, setting a landed state for the aerial vehicle and disarming a rotor of the aerial vehicle;

upon a detection of the free fall by the free-fall test, setting an in-air state for the aerial vehicle and not disarming the rotor of the aerial vehicle.

16. The method of claim 15, wherein the static test is one of the at least two landing tests performed, the static test comprising:

upon a determination that the aerial vehicle has a static state, running a static timer for a predetermined time period; and upon expiration of the predetermined time period, determining that the aerial vehicle remains in the static state.

17. The method of claim 15, wherein the thrust test is one of the at least two landing tests performed, the thrust test comprising:

upon a determination that a thrust level of the aerial vehicle is below a thrust threshold, running a thrust timer for a predetermined time period;

upon expiration of the predetermined time period, determining that the thrust level of the aerial vehicle remains below the thrust threshold; and upon a determination that the thrust level of the aerial vehicle remains below the thrust threshold, determining that the change in altitude of the aerial vehicle is below the altitude change threshold.

18. The method of claim 15, wherein the shock test is one of the at least two landing tests performed, the shock test comprising:

upon a determination that a shock is detected, determining that the aerial vehicle experienced a previous descent; and upon a determination that the aerial vehicle experienced the previous descent, determining that a control input of the aerial vehicle has a stick-down state.

19. The method of claim 15, wherein the at least two landing tests performed are performed simultaneously.

20. The method of claim 15, wherein the in-air state of the aerial vehicle indicates movement of the aerial vehicle above a movement threshold and the landed state of the aerial vehicle indicates movement of the aerial vehicle below the movement threshold.

* * * * *